United States Patent [19]

Urkowitz

[11] Patent Number: 5,760,734
[45] Date of Patent: Jun. 2, 1998

[54] RADAR CLUTTER REMOVAL BY MATRIX PROCESSING

[75] Inventor: Harry Urkowitz, Philadelphia, Pa.

[73] Assignee: Lockheed Martin Corp., Moorestown, N.J.

[21] Appl. No.: 749,609

[22] Filed: Nov. 18, 1996

[51] Int. Cl.[6] .................................................. G01S 13/522
[52] U.S. Cl. .......................... 342/159; 342/162; 342/194; 342/195
[58] Field of Search .................................. 342/161, 162, 342/159, 21, 192, 194, 195, 189

[56] References Cited

U.S. PATENT DOCUMENTS

| | | | |
|---|---|---|---|
| 4,577,193 | 3/1986 | Kiuchi et al. | 342/159 |
| 4,622,552 | 11/1986 | Andrews et al. | 342/196 |
| 4,742,353 | 5/1988 | D'Addio et al. | 342/159 |
| 5,173,706 | 12/1992 | Urkowitz | 342/99 |
| 5,617,099 | 4/1997 | Warren et al. | 342/159 |

OTHER PUBLICATIONS

"Clutter Suppression by Use of Weighted Pulse Trains", by T. Murakami and R.S. Johnson, RCA Missile and Surface Radar Division, Moorestown, NJ, published in RCA Review, vol. 32, Sep. 1971, pp. 402–429.

Primary Examiner—Charles T. Jordan
Assistant Examiner—Christopher K. Montgomery
Attorney, Agent, or Firm—W. H. Meise; S. D. Weinstein; S. A. Young

[57] ABSTRACT

An apparatus and method for radar detection of spectral moments and other spectral characteristics of echoes includes an agile antenna which directs an antenna beam in a direction for a dwell interval. A clutter filter reduces clutter. In order to eliminate the need for fill pulses to stabilize the clutter filter, the clutter filtering is accomplished by matrix multiplication of the echo signal in each range bin by the inverse of the covariance matrix for that range. This reduces the dwell at each range interval, and provides a stream of pulse-to-pulse information at each range interval. The pulse-to-pulse data in each range interval is spectrum analyzed to extract the desired spectral information, which is displayed.

4 Claims, 6 Drawing Sheets

RADAR CLUTTER REMOVAL BY MATRIX PROCESSING

FIELD OF THE INVENTION

This invention relates to radar and like systems, in which the antenna beam switches instantaneously among multiple discrete positions, and in which clutter tends to obscure the desired target signals, so that clutter suppression is advantageous.

BACKGROUND OF THE INVENTION

Radar systems are widely used for many purposes, including military detection and guidance, and for civil air traffic control and weather determination. Other uses include measuring the level of liquids or solids in a container, and measuring the spacing between automobiles. In ultrasonic form, radar systems are even available in hand-held form as a substitute for tape measures, for determining the dimensions of rooms. In some of these contexts, the desired measurement tends to be obscured by clutter, which arises from extraneous reflective elements (generally discrete objects) lying in the path of the transmitting or receiving beam, or both.

When the target tends to give a weak return, or to be obscured by clutter reflections, clutter filtering may be used. Clutter filtering ordinarily uses linear time-invariant filters such as transversal filters, which are subject to transients when started from an empty condition. In a rotating-antenna type of radar system, this transient occurs only once, namely when transmissions start, and the antenna begins to rotate, because the filter is thereafter maintained "full," and the non-zero beamwidth of the scanning antenna beam guarantees that some objects enter the beam (and therefore the filter) as others drop out of the beam. Thus, scanning-antenna radar systems may use time-invariant linear filters. These time-invariant filters can be designed by techniques involving the use of a covariance matrix, as described in the article *Clutter Suppression by Use of Weighted Pulse Trains*, by Murakami et al., published in the September, 1971 issue of RCA Review, Vol 32. Such a linear time-invariant filter, which may be, for example, a transversal filter, provides a single output value within each range interval. In each range interval, the value produced by the linear time-invariant filter depends upon the sum of the desired target signal, plus clutter and noise, in that range interval. The determination of the existence or absence of a target is accomplished by the use of a threshold detector following the filter, which evaluates the amount of energy within the particular range interval, and declares the existence or nonexistence of a target based upon the threshold comparison.

Linear time-invariant clutter filters require initialization at start-up in order to avoid undesirable transients, which might tend to obscure the desired signal. In order to prevent such transients, it is desirable to operate such clutter filters in a steady-state mode. Steady-state operating conditions can be achieved in the filter, immediately before application of the information signal sequence which is to be filtered, by adding "fill" pulses to the information signal sequence. The presence of the fill pulses allows time for the clutter filter to achieve a steady operating state before the information signal sequence is applied to the filter, and as a result the information signal sequences are filtered without significant transients. Some modern radar systems, such as that described in U.S. Pat. No. 5,173,706, issued Dec. 22, 1992 in the name of Urkowitz, use array antennas which are capable of generating a plurality of overlapping fixed beams. Scanning of such antennas is accomplished by instantaneously sequentially switching from one beam to another, generally in a predetermined sequence. Thus, a pulse sequence is transmitted in succession on each fixed beam. Consequently, a linear, time-invariant clutter filter which was associated with such an antenna would receive signals to be processed from an antenna beam at a particular position, preceded in time by signals from the previous antenna beam position. Such preceding signals would be essentially unrelated to the signals from the current beam position, and therefore would not act as fill pulses. The lack of a distinct relationship, in such a system, between the pulses passing through the linear, time-invariant filter, in turn, would produce undesirable transients which would tend to obscure the desired target signals. Fill pulses could be added to each pulse sequence, to precede the pulse sequence which it is desired to filter by a related sequence. However, the use of fill pulses in this manner results in inefficient use of the clutter filter, because the combination of the fill pulses with the information signal sequence is longer than the information signal alone, and fill pulses are associated with each received signal sequence. Consequently, more processing time is required to perform the clutter filtering than might otherwise be necessary. The processor for performing the desired signal processing in a radar system, therefore, must be faster than it might otherwise have to be, or more processing power may be required at the same operating speed.

More important, however, is the fact that the extra fill pulses lengthen the dwell time of the beam at each incremental position, thereby increasing the time needed to survey a specified volume.

Improved radar systems are desired.

SUMMARY OF THE INVENTION

An agile-beam radar system, of the type in which a beam successively occupies a plurality of different angular positions, includes a transmitter for transmitting recurrent electromagnetic signals in a direction of one of the beams for a predetermined time duration. As a result of these transmissions, electromagnetic signals are reflected by targets and clutter lying along the beam. A receiver is coupled for receiving the reflections of the electromagnetic signals, and for generating recurrent sets of received signals. The received signals represent the complex envelope of the reflections of the electromagnetic signals. A sampler is coupled to the receiver, for sampling each of the sets of received signals at times corresponding to discrete range values, for thereby generating recurrent pulse-to-pulse sets of range values. The discrete range values of each of the plural sets together define a pulse-to-pulse finite sequence at constant range. A covariance matrix generator is coupled for receiving clutter-plus-noise signals representative of earlier receptions, and for forming a covariance matrix therefrom for groups of one or more range intervals, as a result of which a plurality of covariance matrices are generated for each pulse-to-pulse interval. An inverse matrix generator is coupled to the sampler and to the covariance matrix generator, for generating an inverse matrix representative of the inverse of each of the covariance matrices. A linear processor is coupled to the sampler and to the inverse matrix generator, for performing matrix multiplication of each of the pulse-to-pulse sequences by that one of the inverse matrices associated with the corresponding range interval, for thereby generating transformed sequences. Each of which transformed sequences has different spectral characteristics than that one of the finite sequences from which it arose, in a manner which tends to reduce clutter in the transformed sequence relative to the desired signal characteristics. The radar system also includes a display for displaying information contained in the transformed sequences.

In one embodiment of the invention, the covariance matrix generator is coupled for receiving clutter-plus-noise signals representative of earlier receptions, and for forming a covariance matrix therefrom for groups of one or more range intervals, whereby a plurality of covariance matrices are generated for each pulse-to-pulse interval.

A method of operation of an agile-beam radar system according to the invention includes the step of successively directing an antenna beam in a plurality of different angular positions. Recurrent electromagnetic signals are transmitted in a direction of one of the beams for a predetermined time duration, whereby electromagnetic signals are reflected by targets and clutter lying along the beam. The reflections of the electromagnetic signals are received, and generate recurrent sets of received signals, which represent the complex envelope of the reflections of the electromagnetic signals. Each of the sets of received signals is sampled at times corresponding to discrete range values, for thereby generating recurrent pulse-to-pulse sets of range values, with the discrete range values of each of the plural sets together defining a pulse-to-pulse finite sequence at constant range. A covariance matrix is formed, from clutter-plus-noise signals representative of earlier receptions, for groups of one or more range intervals, as a result of which a plurality of covariance matrices are generated for each pulse-to-pulse interval. An inverse matrix set is generated, which is representative of the inverse of each of the covariance matrices. Each of the pulse-to-pulse sequences is matrix multiplied by that one of the inverse matrices associated with the corresponding range interval, for thereby generating transformed sequences. Each of the transformed sequences has different spectral characteristics than that one of the finite sequences from which it arose, in a manner which tends to reduce clutter in the transformed sequence relative to the desired signal characteristics. Information contained in the transformed sequences is displayed. In a particular embodiment of the invention, spectral characteristics of the transformed sequences are displayed.

DESCRIPTION OF THE INVENTION

Figure 1:
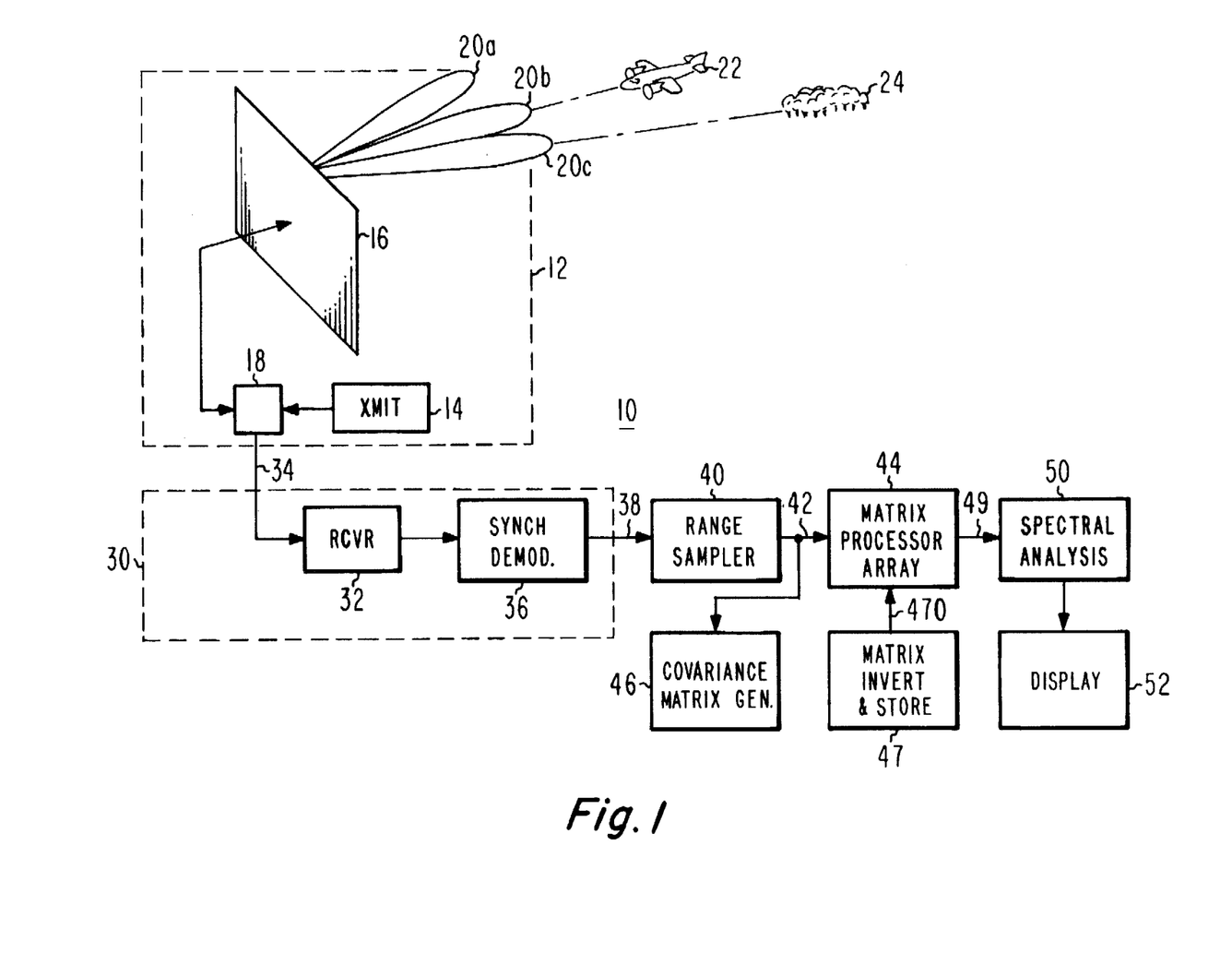
FIG. 1 is a simplified block diagram of a radar system.

In FIG. 1, a radar system designated generally as 10 includes a transmitting arrangement 12. Transmitting arrangement 12 includes a transmitter 14 coupled to an antenna 16 by a transmit-receive device 18. Antenna 16 generates fixed beams, such as illustrative pencil beams 20a, 20b, 20c, on both transmission and reception, and the fixed beams may be pointed in various selected directions, and may even be pointed in different directions for transmission and reception, as described in the abovementioned U.S. Pat. No. 5,173,706. Those skilled in the art know that an array antenna including a plurality of elemental antennas is capable of producing the desired beams and beam shapes, and is capable of essentially instantaneous switching among the various beams. In FIG. 1, a fixed beam 20b directed in a particular direction is illustrated as arriving at a discrete target 22. Other targets, such as a target 24, which may be discrete or diffuse, may lie adjacent to the antenna beam 20b, in such a location that some energy from transmissions impinges on target 24. Target 24 may be considered to represent close-in structures and trees, which as known reflect electromagnetic signals with time-varying characteristics.

The arrangement of FIG. 1 also includes a receiving arrangement 30, which includes a receiver 32 coupled to a port 34 of transmit-receive device 18. Received echo signals are coupled from transmit-receive device 18 to receiver 32, in which the received electromagnetic radiation is converted into received signals at carrier frequency and phase-coherent with the transmitted signal. The phase-coherent signals are coupled from receiver 32 to a synchronous demodulator 36. Synchronous demodulator 36 demodulates the phase-coherent signals from receiver 32, and converts them to the complex envelope of the RF signals, often in the form of I and Q components, often called baseband signals.

The baseband signals from demodulator 36 of FIG. 1 are applied over a signal path 38 to a range sampler 40. Range sampler 40 samples the baseband signal at a rate which defines range increments, to thereby produce a sequence of range-sampled values of the complex envelope signals from demodulator 36 for each transmitted pulse. Consequently, in the presence of a plurality of recurrent transmitted pulses, the received signals recur, and the sequence of range samples produced by range sampler 40 recurs at the pulse repetition rate.

The pulse-to-pulse recurrent range samples are applied from range sampler 40 of FIG. 1 over a path 42 to a matrix processor array illustrated as a block 44. Matrix processor array 44 effectively separates the signals from range sampler 40 into sets of pulse-to-pulse range samples, each of which sets contains the received signal value of a single range interval from a plurality of pulse sequences. Matrix processor array 44 matrix multiplies each pulse-to-pulse sequence of range samples by an inverse covariance matrix, which has been previously generated by an inverse covariance matrix generator 46, to produce, as a product, sequences of pulse-to-pulse values having length equal to that of one set of pulse-to-pulse range samples, in which the ratio of the clutter to the desired signal is reduced by comparison with the original pulse-to-pulse sequence of range values.

Since the pulse-to-pulse sequences produced by processor 44 of FIG. 1 have lower clutter relative to the desired signal than the pulse-to-pulse sequences as demodulated, the information produced by matrix processor array 44 may be processed further and displayed. However, the pulse-to-pulse display is not particularly meaningful. It is therefore preferable to convert the magnitudes of the pulse-to-pulse sequences of range values to single magnitude values for each range. Display of a range sequence of such single values provides a normal type of radar range display. The pulse-to-pulse magnitudes at any given range can be converted into a single magnitude value in a number of ways. The magnitudes could simply be added or averaged to form the magnitude of each range interval. Thus, the average of the pulse-to-pulse sequences at each range interval is a measure of the return energy at that range interval over a number of pulse intervals, and could therefore be displayed directly. When the amplitudes are averaged at each range, the implication is that one is only interested in the amount of energy at each range interval. However, simply examining the magnitude of the return ignores the additional phase information available in the coherent return signal. This phase information includes such information as Doppler rate, which corresponds to radial velocity in the case of a discrete target, and the pattern of Doppler rates, which gives information on the pattern of radial velocities in a diffuse scatterer such as a weather phenomenon (precipitation or clear-air turbulence, for example).

In order to take further advantage of the information available in the coherently demodulated signals, a spectral analysis is performed in the arrangement of FIG. 1 by a spectral analyzer 50. The results of the spectral analysis, representing the frequency components imparted to the reflected echo signals by the motion of the target. The amplitudes of the spectral components separated by analyzer 50 may be displayed, or other spectral properties, such as first moment and second central moment of the spectral density of the components may be displayed by a display unit illustrated as 52. The spectral analysis is known in the art, and is described, for example, in U.S. Pat. No. 5,309,161, issued May 3, 1994 in the name of Urkowitz et al. The first moment represents the mean Doppler frequency shift of the returned signal, and the square-root of the second central moment is a measure of the Doppler frequency spread of the return signal. These have significance principally in weather evaluation.

Figure 2A:
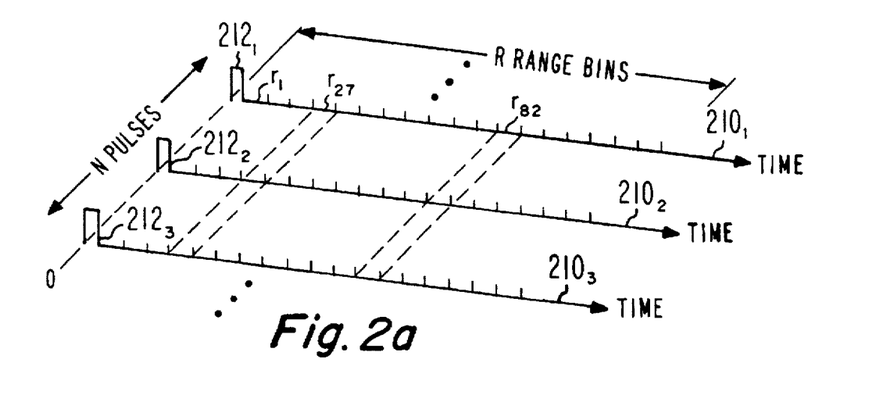
FIG. 2a is a representation of a plurality of time-lines associated with N pulses of the radar system of FIG. 1, to aid in explaining how the inverse covariance matrices, one of which is illustrated in FIG. 2h, are generated.

The generation of the inverse covariance matrix by generator block 46 of FIG. 1 is illustrated in conjunction with FIGS. 2a, 2b, 2c, 2d, and 2e. FIG. 2a illustrates a succession of time lines $210_1$, $210_2$, $210_3$, which are set side-by-side. Each time-line $210_1$, $210_2$, $210_3$ represents the transmission time of one transmitted pulse, together with the following reception times, divided into range bins. Thus, the representative pulse $212_1$ associated with time-line $210_1$ represents the starting time of a particular radar pulse transmission, and the various divisions of time-line $210_1$, some of which are designated $r_{27}$ and $r_{82}$, represent the range bins, following the time of pulse $212_1$, into which received signals are assigned or designated for further processing. Similarly, the representative pulse $212_2$ associated with time-line $210_2$ represents the starting time of a particular radar pulse transmission, later than that of time-line $210_1$, and the various divisions of time-line $210_2$, some of which are designated $r_{27}$ and $r_{82}$, represent the range bins following the time of pulse $212_2$. In the same manner, representative pulse $212_3$ associated with time-line $210_3$ represents the starting time of a particular radar pulse transmission, later than that of either time-line $210_1$, or $210_2$, and the various divisions of time-line $210_3$, some of which are designated $r_{27}$ and $r_{82}$, represent range bins following the time of pulse $212_3$. Consequently, range bins $r_{27}$ and $r_{82}$ represent the same time after transmission of their respective pulses in their respective time lines $210_1$, $210_2$, and $210_3$. It can be seen that the time-lines 210 illustrated in FIG. 2a are those associated with a group of N pulses, and as a result there are N time-lines in FIG. 2a. It should be understood that the range bins 27 and 82 are selected merely to be representative of all of the range bins ranging from range bin 1 to range bin R, for simplicity in exemplary explanations.

Figure 2B:
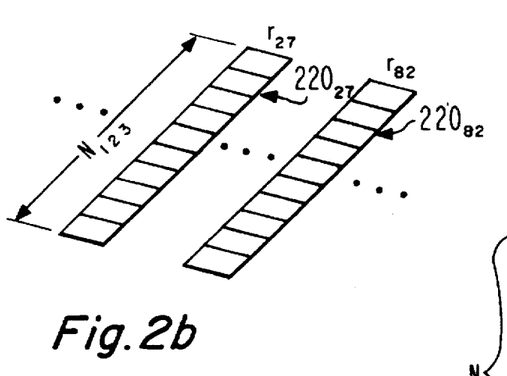
FIG. 2b represents pulse-to-pulse sequences, of N elements each, at selected single ranges from the diagram of FIG. 2a, FIG. 2c illustrates a first step involved in one way to generate the N×N covariance matrix of FIG. 2h.

FIG. 2b represents the selection of a group $220_{27}$ of the return signal values, selected from the same range bin $r_{27}$ in each of the N time-lines 210 of FIG. 1a, and a group $220_{82}$ of the return signal values, selected from the same range bin $r_{82}$ in each of the N time-lines 210 of FIG. 1a, from among all the possible groups $220_r$, where range bin r may range from 1 to R. Group $220_{27}$ of FIG. 2b has N range bins, illustrated by squares, into which the complex value of the return signal at the corresponding range bin time is entered. There are N such range bin squares in group $220_{27}$ of FIG. 2b because there are N pulse intervals (N time-lines $210_1$, $210_2$, and $210_3$ ... in FIG. 2a. As mentioned, FIG. 2b also represents the selection of a group $220_{82}$ of the return signal values, selected from the same range bin $r_{82}$ in each of the N time-lines 210 of FIG. 1a. Consequently, group $220_{82}$ of FIG. 2b has N range bins, illustrated by squares. It will be appreciated that such a group of range bin values can be generated for each incremental range bin value of the R time-lines 210 of FIG. 1a, and that each of the groups of bin values 220 will have N bin values.

Figure 2C:
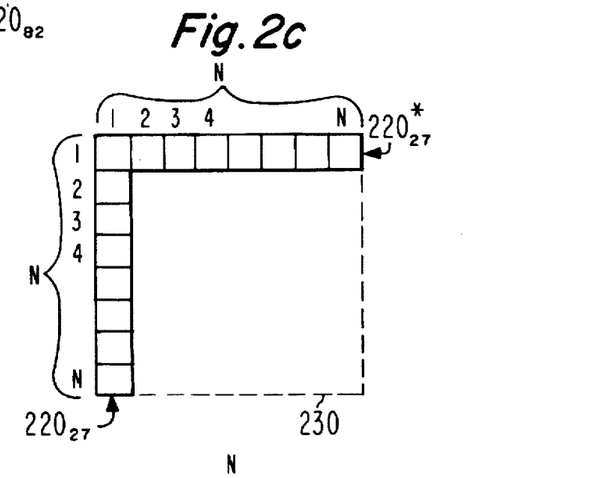

For each of the groups 220 of FIG. 2b, an array of values can be set up, as illustrated in FIG. 2c. In FIG. 2c, the group $220_{27}$ has been laid out along the left edge of a rectangular array illustrated as 230, with its first element (1) uppermost. Along the top edge of array 230, a further line array $220_{27}*$ is laid out horizontally, with its first (left) range value element overlapping the first (topmost) range value element. The values of each element of line array $220_{27}*$ are the complex conjugate of the values of the corresponding elements of line array $220_{27}$ of FIG. 2c.

Figure 2D:
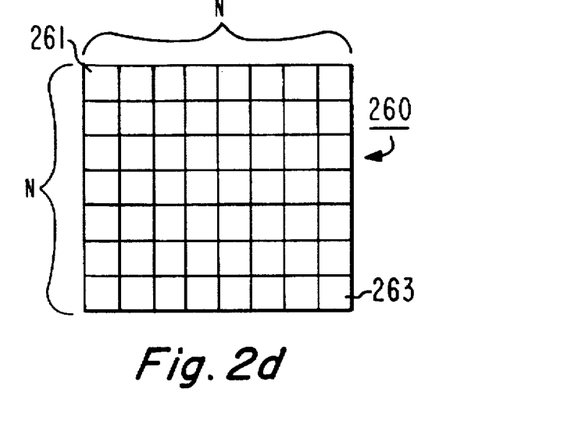
FIG. 2d illustrates a second step in the formation of the N×N covariance matrix, which is performed after the first step of FIG. 2c.

FIG. 2d illustrates a square N×N matrix 260, resulting from the multiplication of each element of vertical column matrix $220_{27}$ by a (conjugate) element of horizontal line matrix $220_{27}*$. Thus, for example, the upper-left element 261 of matrix 260 of FIG. 2d is the product of the value of range bin 1 of vertical array $220_{27}$ of FIG. 2c (the top-most element of vertical array $220_{27}$) multiplied by the value of range bin 1 (the left-most element) of horizontal array $220_{27}*$. Similarly, the lower-right element 263 of matrix 260 of FIG. 2d is the product of the value of range bin N of vertical array $220_{27}$ of FIG. 2c (the lower-most element of vertical array $220_{27}$) multiplied by the value of range bin N (the right-most element) of horizontal array $220_{27}*$. More generally, each element of matrix 260 of FIG. 2d represents the product of a range bin value multiplied by the complex conjugate of a range bin value, which is from the same range bin.

In order to generate the covariance matrix, the process illustrated in FIGS. 2a through 2d is repeated a number of times, using a different set of N transmitted pulses 212 and the associated time-lines 210, as a result of which a plurality of N×N matrices are generated, each of which corresponds to matrix 260 of FIG. 2d, but in which the individual elements will, in general, have different values, because the values of the return echo signal at any range bin represent a variable phenomenon, and sets of data taken at different times will, in general, produce different values. These various matrices 260, which are, in general, formed at different times, and may be designated $260_1$, $260_2$, ..., $260K$, representing the performance of the procedure described in conjunction with FIGS. 2a–2d K times.

Figure 2E:
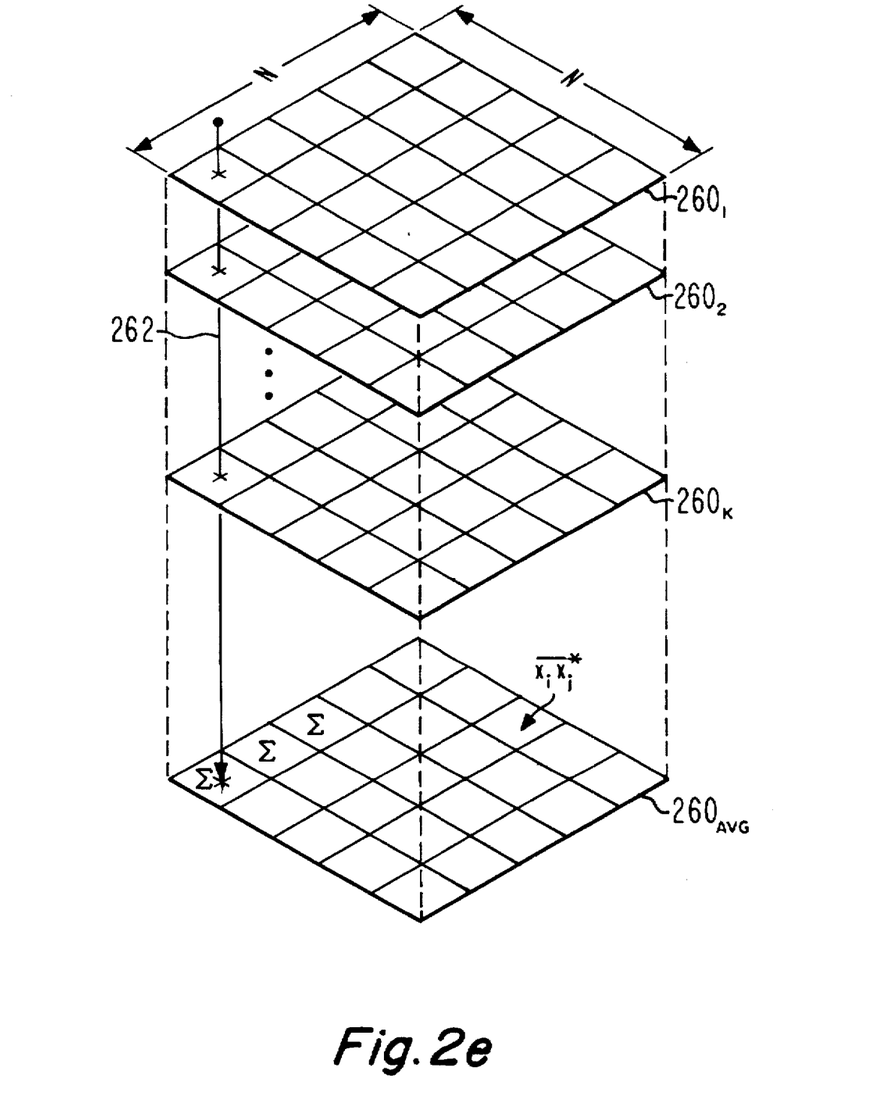
FIG. 2e represents the process by which a plurality of matrices corresponding to that of FIG. 2d form an N×N average matrix.

FIG. 2e illustrates the "stacking" of N×N matrices $260_1$, $260_2$, ..., $260K$ in a manner which aligns their respective elements. Once all of the matrices are stacked in the manner illustrated in FIG. 2e, the corresponding elements are summed. The summation of the first element of each of matrices $260_1$, $260_2$, ..., $260K$ is represented in FIG. 2e by a vertical line 262 extending through the first elements of matrices $260_1$, $260_2$, ..., $260K$, and ending on the corresponding first element ($\Sigma$) of an average matrix $260_{avg}$. Thus, the first element of average matrix $260_{avg}$ takes a value which is the average of the values of all the first elements of matrices $260_1$, $260_2$, ..., $260K$. Similarly, the other elements of average matrix $260_{avg}$ each represent the average of the corresponding elements of matrices $260_1$, $260_2$, ..., $260K$. The value of each element of average matrix $260_{avg}$ may be designated as a product of an x value multiplied by a conjugate y value, where each of the values represents an average over N pulse intervals $$\overline{x_i x_j^*}$$

Figure 2F:
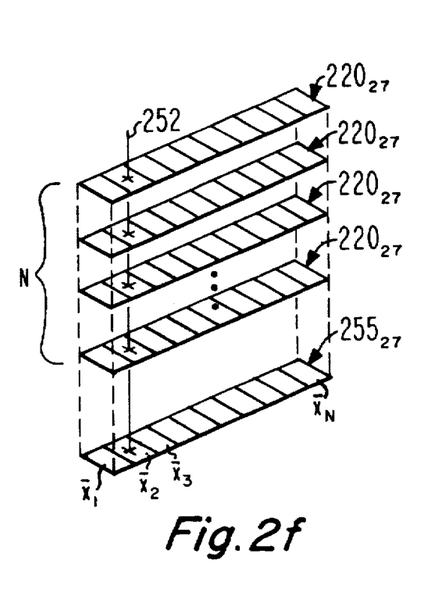
FIG. 2f represents the process of forming an average line vector.

In order to make each average value contained in each $\Sigma$ element of average matrix $260_{avg}$ into a covariance value, a product of averages must be subtracted from each of the average $\Sigma$ values found in the elements of average matrix $260_{avg}$. The product of averages is formed, first, by "stacking" each pulse-to-pulse sequence 220, such as pulse-to-pulse sequence $220_{27}$ of FIG. 2b, with other such pulse-to-pulse sequences 220 derived from other sets of N pulses, somewhat as described in conjunction with FIG. 2e. In FIG. 2f, a plurality N of line matrices, all of which are designated $220_{27}$ since they are essentially the same piece of information, but derived from different sets of pulses, are stacked. Second, an average is formed of the values of each element of arrays 220, such as array $220_{27}$ of FIG. 2f, as suggested by vertical line 252 passing through the second elements of each array $220_{27}$, whereupon the average values appear as the elements $\overline{x}_1, \overline{x}_2, ..., \overline{x}_N$ of another line array or line matrix $255_{27}$.

Figure 2G:
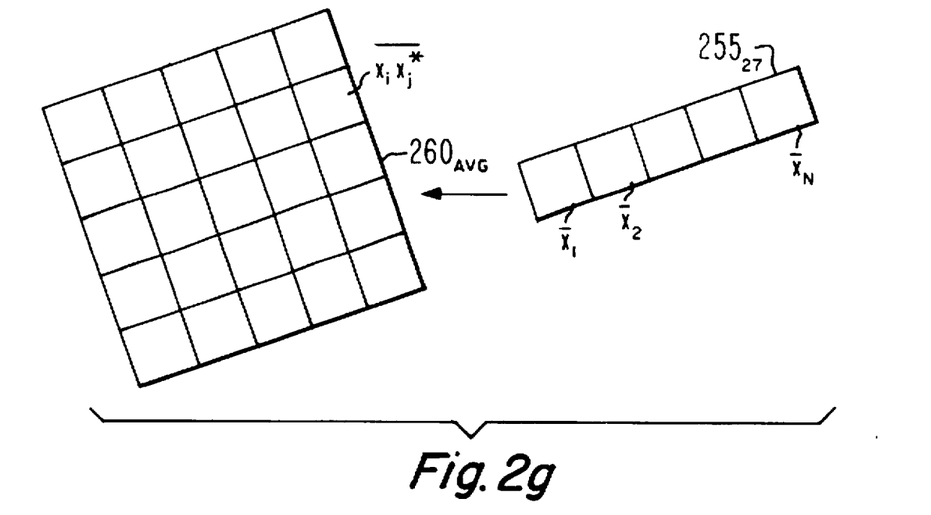
FIGS. 2g and 2h represent the process of forming the N×N covariance matrix.
Figure 2H:
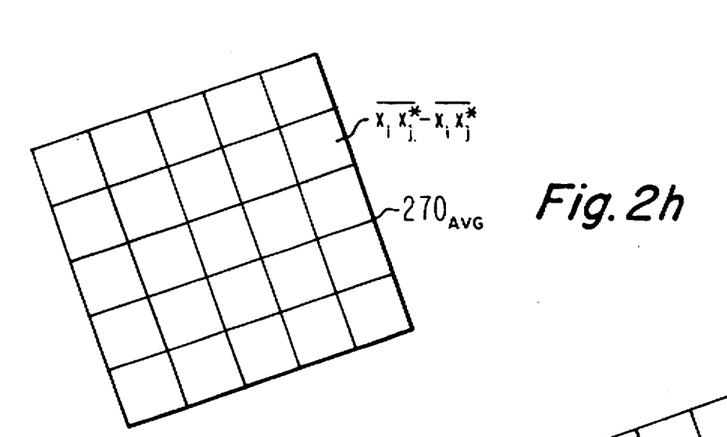

The average values $\overline{x}_1, \overline{x}_2, ..., \overline{x}_N$ of the line vector $255_{27}$ and their conjugates are combined with the elements of the average matrix $260_{AVG}$ of FIG. 2e to form the elements of the covariance matrix $270_{AVG}$, as illustrated in FIGS. 2g and 2h. The element $$\overline{x_i x_j^*}$$

of matrix $260_{AVG}$ is diminished by the product $$\overline{x}_i \ \overline{x}_j^*$$

of the i-th element and the conjugated j-th element of line vector $255_{27}$ to form the element $$\overline{x_i x_j^*} - \overline{x}_i \ \overline{x}_j^*$$

of the average matrix $270_{AVG}$, illustrated in FIG. 2h.

Each element of average matrix $270_{avg}$ is an estimate of the auto-covariance (also known simply as covariance) of the vector random process arising from the clutter. The covariance matrix $270_{avg}$ represents only one range bin evaluated over a plurality of time lines or pulses.

The process described in conjunction with FIGS. 2a through 2e is performed for each range bin of interest, which may be all range bins. For convenience, some range bins may be grouped together for purposes of generation of the covariance matrix $270_{avg}$, based upon the assumption that the abovementioned random variation changes only slowly with range.

Figure 2I:
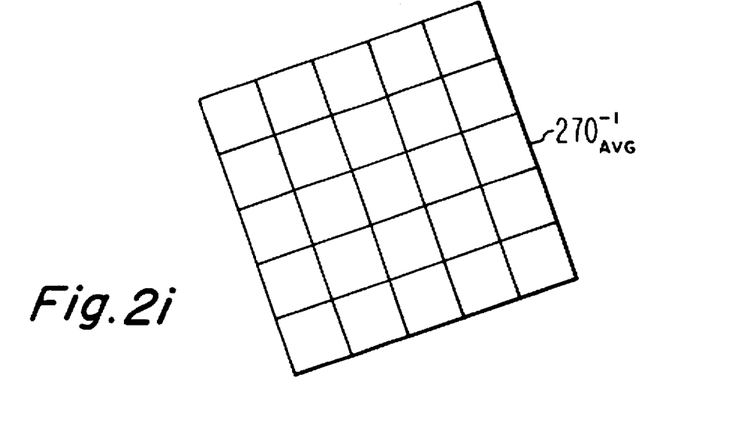
FIG. 2i illustrates the N×N inverse covariance matrix derived from the matrix of FIG. 2h.

Once all the covariance or sum matrices (one for each range bin of interest) are generated as described in conjunction with FIGS. 2a–2e, the next processing step is to send the covariance matrices $270_{avg}$ to inversion and storage block 47 of FIG. 1, to generate the desired inverse covariance matrices $270_{avg}^{-1}$, one of which is illustrated in FIG. 2i, and to store the results for later application to matrix processor array 44. The function performed in inversion block 47 is accomplished by conventional mathematical transformations. Since the processing by which the covariance matrices are generated in block 46 is performed in the absence of a target, before normal radar operation seeking a target, the covariance matrices themselves contain or represent only noise-plus-clutter (total interference). Inversion of each N×N covariance matrix $270_{avg}$ in block 47 generates an N×N matrix $270_{avg}^{-1}$ representing the inverse of the sum of clutter plus noise for each range bin. This inverse covariance matrix for each range bin is stored in block 47 of FIG. 1 for later application by way of a signal path 470 to matrix processor array 44 for use therein. The received target-information-bearing signal, when multiplied by the inverse covariance matrix in matrix processor array 44 of FIG. 1, tends to reduce the total interference, including the clutter. Of course, none of the processes are perfect, and residual clutter and noise will remain in the processed signal at the output of matrix processor array 44.

It should be emphasized that it is possible to store precursors of the inverse covariance matrix rather than storing the inverse covariance matrix itself; storage of such precursors then requires that the inverse covariance matrix be calculated from the precursors each time it is to be used. Storage of the inverse covariance matrix itself, rather than of its precursors, reduces the amount of computation which must be done when processing actual target-bearing signal information, and is preferred for that reason.

Furthermore, elements of the inverse covariance matrix may be pre-computed based on earlier derived power density spectra of the clutter echo. In such cases, the covariance matrix and its inverse may be computed directly from the abovementioned earlier derived power density by methods well known to those skilled in the art, involving inverse Fourier transformation to obtain an autocorrelation function, and then sampling that autocorrelation function to produce the elements of the covariance matrix. Inversion of the thus-obtained covariance matrix produces the inverse covariance matrix which is to be stored.

Figure 3A:
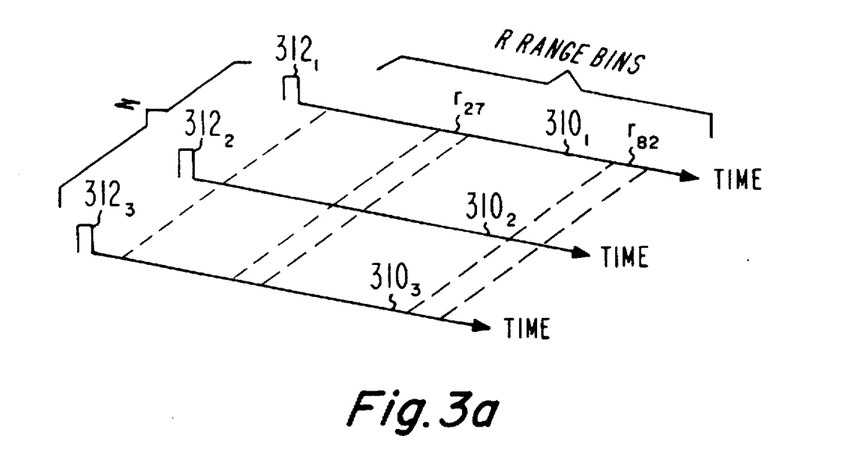
FIG. 3a replicates FIG. 2a for convenience.

FIG. 3a is similar to FIG. 2a, but represents currently arriving signals including target information, rather than currently arriving signals which are exclusively clutter-plus-noise. Elements of FIG. 3a corresponding to those of FIG. 2a are designated by like reference numerals, or like reference numerals in the 300 series, rather than the 200 series.

Figure 3B:
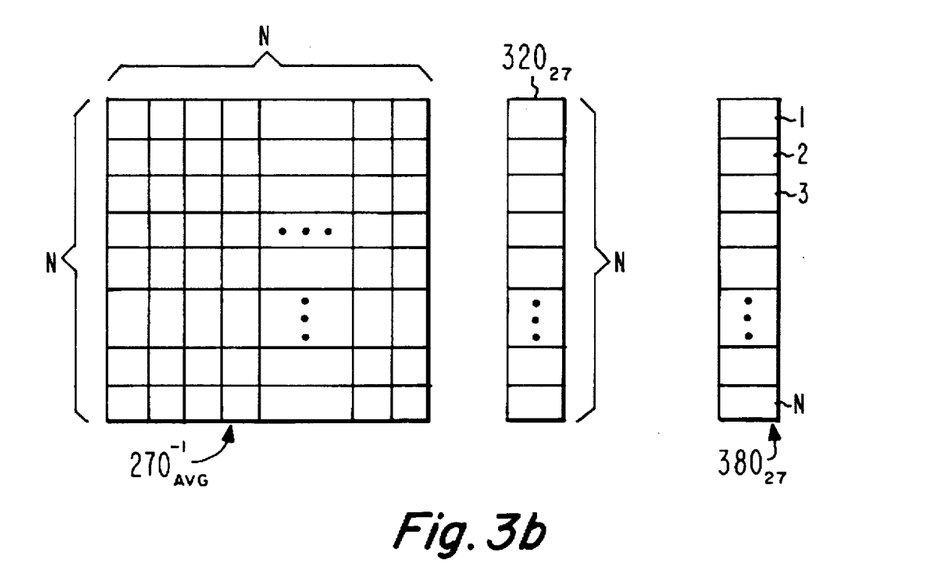
FIG. 3b is a simplified representation of the mathematical procedure for reducing the noise and clutter in a received signal by premultiplying the pulse-to-pulse sequence at each range bin by the inverse covariance matrix.

FIG. 3b illustrates the N-element pulse-to-pulse sequence or vector $320_{27}$ of received signal values lying within range bin 27, arranged in a vertical column array form. FIG. 3b also illustrates the N×N square inverse covariance matrix $270_{avg}^{-1}$, arranged adjacent to column array $320_{27}$, ready for multiplication. The premultiplication of the column array by the square array of the same order results (=) in a product in the form of an N-element column array, designated $380_{27}$ in FIG. 3b, which represents the pulse-to-pulse value of the total received signals within range bin 27. The premultiplication of the desired-target+clutter+noise signals represented by column array $320_{27}$ by the inverse of the clutter+noise signals represented by inverse covariance matrix $270_{avg}^{-1}$ essentially multiplies the noise-plus-clutter signal accompanying the desired target signal by its own inverse (insofar as the value of the noise-plus-clutter signal can be estimated), and results in a reduction of the clutter-plus-noise accompanying the desired target signal. The desired target signal is then easier to identify.

The described technique for using inverse covariance matrices for reduction of clutter and noise in a radar system differs markedly from that described in the abovementioned Murakami et al. article. The Murakami et al. arrangement produces a single value for each range interval, from which information as to the presence or absence of a target may be derived, as described above. By contrast, the arrangement according to the invention generates a time sequence of values for each range interval. More specifically, the arrangement according to the invention produces a signal, such as $380_{27}$, for each range interval (in this example, of course, the range interval is 27), whereas the Murakami et al. arrangement would produce only a single value. The presence of the time sequence of values, namely the value at range bin 27 over a plurality of pulse intervals, allows frequency information to be extracted from each range bin. More particularly, the first element of signal $380_{27}$ represents the value of the return signal within range bin 27 as a result of the first pulse of an N-pulse sequence, the second element of signal $380_{27}$ represents the value of the return signal within range bin 27 as a result of the second pulse of an N-pulse sequence, and the last or $N^{th}$ element of signal $380_{27}$ represents the value of the return signal within range bin 27 as a result of the $N^{th}$ pulse of an N-pulse sequence.

Figure 4:
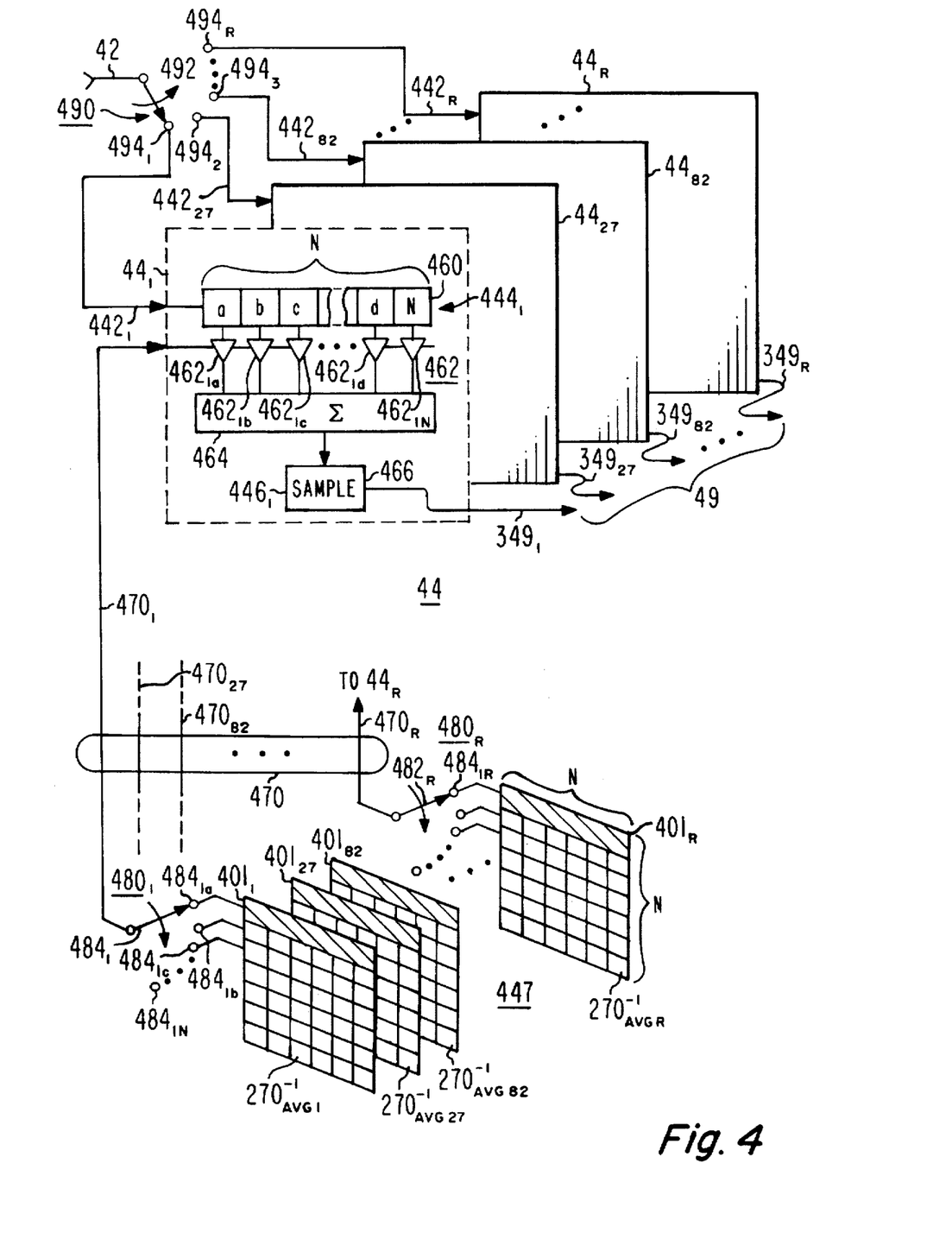
FIG. 4 is a simplified block diagram of a portion of the arrangement of FIG. 1.

FIG. 4 illustrates a possible embodiment of matrix processor array 44 of FIG. 1. In FIG. 4, matrix processor array 44 includes a plurality R of individual matrix processors designated $44_1$, $44_2$, $44_3$, . . . $44_R$, corresponding to one for each range bin. Each individual matrix processor $44_x$ (where x represents any subscript ranging from 1 to R) of FIG. 4 includes a transversal filter 444 (only the first, namely transversal filter $444_1$, is illustrated) with controllable weights, and a sampler 446. Transversal filter $444_1$ and the sampler $446_1$ of individual matrix processor $44_1$ are illustrated as being representative of the others, which are not illustrated.

In FIG. 4, received sampled signal echoes are received over signal path 42 from range sampler 40 of FIG. 1. The sampled range signal echoes are applied to a distribution switch 490, illustrated for ease of understanding as including a common rotating mechanical distribution element 492, which successively contacts a plurality R of fixed switch contacts 494. More specifically, rotating element 492 of switch 490 rotates or moves by one fixed switch contact for each of R range intervals, so that the sampled range information from the first range interval is coupled from rotating contact 492 to switch contact $494_1$, . . . , the sampled range information relating to the twenty-seventh range interval is coupled to switch contact $494_{27}$, . . . , the sampled range information from the eighty-second range interval is coupled from rotating contact 492 to switch contact $494_{82}$, . . . , and the sampled range information relating to the last or $R^{th}$ range interval is coupled to switch contact $494_R$. The following pulse period then starts, and the rotating switch element 492 continues to rotate, to couple the return signal from the first range interval of the second pulse interval to fixed switch contact $494_1$. Switch element 492 continues to rotate, always coupling a return echo signal from a particular range interval to a corresponding fixed contact 494 of switch 490.

Each fixed contact 494 of switch 490 of FIG. 4 thus always receives the returned echo signal for a particular range interval. Each contact 494 is coupled by a signal path 442 to a corresponding individual matrix processor $44_x$. For example, switch contact $494_1$ is coupled by signal path $442_1$ to a first individual matrix processor $44_1$, . . . , switch contact $494_{27}$ is coupled by signal path $442_{27}$ to a further individual matrix processor $44_{27}$, . . . , switch contact $494_{82}$ is coupled by signal path $442_{82}$ to an eighty-second individual matrix processor $44_{82}$, . . . , and last switch contact $494_R$ is coupled by signal path $442_R$ to a last individual matrix processor $44_R$.

Each individual matrix processor $44_x$ of FIG. 4 includes an N-element transversal filter and a sampler. More particularly, exemplary individual matrix processor $44_1$ includes a transversal filter $444_1$ including an N-element tapped delay line 460, an array 462 of controllable weighted taps $462_{1a}$, $462_{1b}$, $462_{1c}$, . . . , $462_{1d}$, and $462_{1N}$, a summing circuit or summer $464_1$, and a sampler $466_1$. The subscript "1" identifies the various elements as being associated with first individual matrix processor element $44_1$. Each of the other individual matrix processors $44_2$–$44_R$ of FIG. 4 contains a similar transversal filter and sampler, which for simplicity are not illustrated.

As illustrated in FIG. 4, each illustrated weighted tap $462_{1a}$, $462_{1b}$, $462_{1c}$, . . . , $462_{1d}$, and $462_{1N}$ associated with N-tap delay line 460 is identified by suffix including a letter of the alphabet. The illustrated taps are a, b, c, . . . , d, and last tap N. A signal weighted by the current (present-time) controlled weight of the associated controllable weighted tap of tap weight array 462 is coupled to each tap a, b, c, . . . d, N of delay line 460. More particularly, a first controllable weight $462_{1a}$ is coupled to the first tap a of delay line 460, a second controllable weight $462_{1b}$ is coupled to the second tap b of delay line 460, a third controllable weight $462_{1c}$ is coupled to the third tap c of delay line 460, a controllable weight $462_{1d}$ is coupled to tap d of delay line 460, and a controllable weight $462_{1N}$ is coupled to last tap N of delay line 460. Thus, in operation, each controllable tap of array 462 is coupled to a tap of delay line 460 which contains information from successive pulses, at the same range interval. Controllable weights of weight array 462 multiply the signals appearing at the taps a, b, c, . . . , d, N by weighting values which are selected under the control of control signals applied over signal paths $470_x$ illustrated together as 470. For example, signals applied over a parallel signal path $470_1$ independently or individually control the weights of weighting elements $462_{1a}$, $462_{1b}$, $462_{1c}$, . . . , $462_{1d}$, and $462_{1N}$. Similarly, signals applied over parallel signal paths illustrated together as $470_2$ independently or individually control the weights of weighting elements (not illustrated) associated with a transversal filter (not illustrated) associated with individual matrix processor $44_{27}$, signals applied over parallel signal paths illustrated together as $470_{82}$ independently or individually control the weights of weighting elements (not illustrated) associated with a transversal filter (not illustrated) associated with individual matrix processor $44_{82}$, and signals applied over parallel signal paths illustrated together as $470_R$ independently or individually control the weights of weighting elements (not illustrated) associated with a transversal filter (not illustrated) associated with individual matrix processor $44_R$.

The control signals for controlling the weights of the various transversal filters, such as transversal filter $444_1$ of FIG. 4, are derived from inverse covariance matrices stored in inverter and store 47 of FIG. 1. In FIG. 4, the various stored inverse covariance matrices are designated together as 447, and illustrated as N×N square matrices $270_{avg1}^{-1}$, $270_{avg27}^{-1}$, $270_{avg82}^{-1}$, $270_{avgR}^{-1}$. Each stored inverse covariance matrix $270_{avg1}^{-1}$, $270_{avg27}^{-1}$, $270_{avg82}^{-1}$, $270_{avgR}^{-1}$ is associated with a single range interval, indicated in the subscript identification. Consequently, each inverse covariance matrix $270_{avg1}^{-1}$, $270_{avg27}^{-1}$, $270_{avg82}^{-1}$, $270_{avgR}^{-1}$, is uniquely associated with one of the transversal filters 444 of individual matrix processors $44_1$, $44_{27}$, $44_{82}$, $44_R$ of FIG. 4.

As illustrated in FIG. 4, parallel signal path $470_1$ is connected to the movable element $482_1$ of a first switch $480_1$. Movable element $482_1$ is controlled to move successively to contact switch terminals $484_{1a}$, $484_{1b}$, $484_{1c}$, .... $484_{1N}$. Each switch terminal $484_{1a}$, $484_{1b}$, $484_{1c}$, .... $484$1N connects to one N-element row of the first inverse covariance matrix $270_{avg1}^{-1}$. Since each N-element row of the inverse first covariance matrix includes N independent pieces of information, both switch $480_1$ and signal path $470_1$ must carry N parallel pieces of information. If the data is, for example, eight bits wide, the parallel path must be 8N wide. All of the information in the N elements of each row of first inverse covariance matrix $270_{avg1}^{-1}$ is eventually carried over parallel signal path $470_1$ to the weighting elements 462 of matrix processor $44_1$ of FIG. 4, N elements at a time. Similarly, parallel signal path $470_R$ is connected to the movable element $482_R$ of last switch $480_R$. Movable element $482_R$ is controlled to move successively to contact switch terminals $484_{1R}$, and other switch terminals corresponding to those described in conjunction with switch $480_1$. Each switch terminal $484_{1R}$, ... connects, in succession, to one N-element row of the first inverse covariance matrix $270_{avg1}^{-1}$, and makes the information of that row available on parallel signal path $470_R$. As in the case of signal path $470_1$, the parallel path $470_R$ is 8N wide (again, assuming eight-bit wide data). All of the information in the N elements of each row of last inverse covariance matrix $270_{avgR}^{-1}$ is eventually carried over parallel signal path $470_R$ to the weighting elements of matrix processor $44_R$ of FIG. 4, N elements at a time. All of the individual matrix processors, such as individual matrix processors $44_{27}$ and $44_{82}$, lying between individual matrix processors $44_1$ and $44_R$, are similarly connected by parallel signal lines, some of which are illustrated as $470_{27}$ and $470_{82}$, to corresponding ones of the array of stored inverse covariance matrices 447.

In operation of the arrangement of FIG. 1 with the matrix processor of FIG. 4, transversal filter $444_1$ of individual matrix processor $44_1$ includes N-element tapped delay line 460, which receives at its input port (from input path $442_1$) the return signal from the first range bin ($r_1$) of the first sequence of R range bins associated with the first pulse or time interval $210_1$. The return signal from the first range bin is stored in register 460a. After the first range bin is stored, movable switch element 492 of switch 490 moves up by one terminal, and the return echo in the second range bin of the first pulse time line $210_1$ is coupled to the first register of a second shift register (not illustrated), corresponding to register 460a, associated with a further transversal filter (not illustrated) of a further individual matrix processor (not illustrated) of matrix processor arrangement 447. Switch 490 of FIG. 4 continues to rotate at the range sample or range clock rate, eventually coupling the return signal information from the $27^{th}$ range interval to the first register of a shift register corresponding to shift register 460, but associated with a transversal filter (not illustrated) associated with individual matrix processor $44_{27}$. Switch 490 continues to rotate at the range sample or range clock rate, eventually coupling the return signal information from the $82^{th}$ range interval to the first register (not illustrated) of a shift register (not illustrated) of a delay line (not illustrated) of a transversal filter (not illustrated), corresponding to the first register a of shift register delay line 460 of transversal filter $444_1$ of individual matrix processor $44_1$, but associated with transversal filter $44_{82}$. This procedure continues until the end of the range bins of interest, and the information from the $r^{th}$ range bin is stored in the first register of a shift register (not illustrated) of the transversal filter associated with last individual matrix processor $44_R$. At this point in the processing, the first range bins, corresponding to range bin 460a of transversal filter $44_1$ of FIG. 4, are filled, with the data being derived from the first through the $R^{th}$ range bins of the first time line.

Switch element 492 of switch 490 continues to rotate as a second time line of echo signals is received. The information previously stored in the first register 460a of FIG. 4 is transferred or shifted to second register 460b of transversal filter $44_1$ of FIG. 4, and information relating to the first range bin of the second time line is stored in register 460a. After the echo signal from the first range bin of the second time line is stored, movable switch element 492 of switch 490 moves up by one terminal, and the return echo in the second range bin of the second time line $210_1$ is coupled to the first register of a second shift register (not illustrated), corresponding to register 460a, but associated with a further transversal filter (not illustrated) of transversal filter arrangement 44, and at the same time the information previously stored in the first register is transferred to the second register. Switch 490 continues to rotate at the range sample or range clock rate, eventually coupling the return signal information from the $27^{th}$ range interval of the second time line to the first register of a shift register corresponding to shift register 460, but associated with transversal filter $44_{27}$, and the information previously located in the first register is simultaneously transferred to the second register. Switch 490 continues to rotate at the range sample or range clock rate, eventually coupling the return signal information from the $82^{th}$ range interval of the second time line to the first register of a shift register corresponding to shift register 460, but associated with transversal filter $44_{82}$, simultaneous with transfer of the information in the first register to a second register. This procedure continues until the end of the range bins of interest in the second time line, at which time the information from the $r^{th}$ range bin is stored in the first register of a shift register (not illustrated) associated with last transversal filter $44_R$, and the information previously stored in the first register is transferred to a second register of the shift register. At this point in the processing, the first bins of the shift register delay lines, corresponding to bin 460a of the transversal filter $444_1$ of individual matrix processor $44_1$ of FIG. 4, are filled, with the data being derived from the first through the $R^{th}$ range bins of the second time line, while the second bins, corresponding to bin 460b of transversal filter $444_1$ of the individual matrix processor $44_1$ of FIG. 4, are filled, with the data being derived from the first through the $R^{th}$ range bins of the first time line. The described procedure continues for N cycles, with the result that at the end of N cycles involving N time-lines, each register 460a, 460b, 460c, ...., 460d, 460N of each of the transversal filters $44_1$, ...., $44_{27}$, .... $44_{82}$, ...., $44_N$, is filled, in a manner such that the first register (corresponding to register 460a of FIG. 4) of each of the transversal filters of individual matrix processors $44_x$ contains information derived from one of the range intervals of the $N^{th}$ time line, and each of the other registers is filled in such a manner that the $N^{th}$ register of each of the shift register delay lines 460 is filled with information from a particular range bin from the first time-line, and so that the information associated with the transversal filter of individual matrix processor $44_1$ is derived solely from the first range intervals of the N time-lines, . . . , the information associated with the transversal filter of individual matrix processor $44_{27}$ is derived solely from the twenty-seventh range intervals of the N time-lines, . . . , the information associated with the transversal filter of individual matrix processor $44_{82}$ is derived solely from the eighty-second range intervals of the N time-lines, . . . , and the information associated with the transversal filter of individual matrix processor $44_R$ is derived solely from the $R^{th}$ range intervals of the N time-lines.

As the registers a, b, c, . . . , d, N of shift registers 460 of FIG. 4 are filled, the values currently stored in the registers are weighted by the associated weighting circuits or multipliers 462, and summed in summing circuit 464. More particularly, the value of the first range interval of one of the N time-lines which is currently stored in register a of shift register 460 is multiplied by the weight assigned to controllable weighting circuit $462_{1a}$, and the weighted echo value is applied to an input port of summing circuit 464. At the same time, the value of the first range interval of one of the N time-lines which is currently stored in register b of shift register 460 is multiplied by the weight assigned to controllable weighting circuit $462_{1b}$, and the weighted echo value is applied to an input port of summing circuit 464 to be summed with the corresponding values applied to the other input ports of summing circuit 464. Also at the same time, the value of the first range interval of one of the N time-lines which is currently stored in each register, such as register d, of shift register 460, is multiplied by the weight assigned to the corresponding one of the controllable weighting circuits 462, such as weighting circuit $462_{1d}$, and the weighted echo value is applied to an input port of summing circuit 464 to be summed with the corresponding values applied to the other input ports of summing circuit 464. Eventually, when all the registers are full, the sum produced by the summing circuit 464 is sampled by a sampling circuit illustrated as 466. At the same time, a corresponding sum is sampled in a corresponding manner in the transversal filters of all the other individual matrix processors $44_x$. The sampled sum values are taken from sampling circuit 466 by a signal path $349_1$, and the signals from corresponding ones of the transversal filters $44_x$ are coupled out by other signal paths $349_x$. More particularly, the sum signal sampled by a sampling circuit (not illustrated) associated with the transversal filter (not illustrated) of individual matrix processor $44_{27}$ is led out by a corresponding signal path $349_{27}$, the sum signal sampled by a sampling circuit (not illustrated) associated with the transversal filter or individual matrix processor $44_{82}$ is led out by a corresponding signal path $349_{82}$, and the sum signal sampled by a sampling circuit (not illustrated) associated with the transversal filter (not illustrated) of individual matrix processor $44_R$ is led out by a corresponding signal path $349_R$. Signal paths $349_x$ taken together correspond to signal path 49 of FIG. 1.

As so far described, the weighting provided by weighting circuits $462_x$ has been described as being controlled, without explanation of the nature of the control. Referring to FIG. 4, the movable portions $482_x$ of switches $480_x$ move from one contact 484 to the next at the rate of the time-lines. Thus, switch 490 switches at the relatively fast rate of the range bin clock, which is R times per time-line, while switches $480_x$ switch at the pulse rate, or once per time-line. At the instant of time illustrated in FIG. 4, movable elements $482_x$ of switches $480_x$ are all connected to the uppermost contact terminal $484_{xa}$. More particularly, the movable element of $482_1$ of switch $480_1$ is connected to contact terminal $484_{1a}$, . . . , and the movable element of $482_R$ of switch $480_R$ is connected to contact terminal $484_{1R}$. As a result, the N pieces of information in the first row of the associated inverse covariance matrices is made available for control of the N weighting circuits $462_x$ of the associated transverse filters $44_x$. More particularly, in the illustrated positions of the switches in FIG. 4, the information in the N elements of the first row (shaded elements $401_1$) of inverse covariance matrix $270_{avg1}^{-1}$ is available for control of the N weighting circuits $462_{1a}, 462_{1b}, 462_{1c}, \ldots, 462_{1d}, 462_{1N}$ of transversal filter $444_1$ of first individual matrix processor $44_1$, . . . , the information in the N elements of the first row (shaded elements $401_{27}$) of inverse covariance matrix $270_{avg27}^{-1}$ is available for control of the weighting circuits of the transversal filter (not illustrated) associated with individual matrix processor $44_{27}$ which correspond to weighting circuits $462_{1a}, 462_{1b}, 462_{1c}, \ldots, 462_{1d}, 462_{1N}$ of individual matrix processor $44_1$, . . . , the information in the N elements of the first row (shaded elements $401_{82}$) of inverse covariance matrix $270_{avg82}^{-1}$ is available for control of the weighting circuits of individual matrix processor $44_{82}$ which correspond to weighting circuits $462_{1a}, 462_{1b}, 462_{1c}, \ldots, 462_{1d}, 462_{1N}$ of transversal filter $44_1$, . . . , and the information in the N elements of the first row (shaded elements $401_R$) of inverse covariance matrix $270_{avgR}^{-1}$ is available for control of the weighting circuits of the transversal filter (not illustrated) associated with individual matrix processor $44_R$, which correspond to weighting circuits $462_{1a}, 462_{1b}, 462_{1c}, \ldots, 462_{1d}, 462_{1N}$ of individual matrix processor $44_1$. Each of the N weighting elements $462_{xx}$ of each of the transversal filters $44_x$ is controlled by the information stored in a corresponding one of the N elements of a row of the inverse covariance matrix. For example, in the illustrated positions of the switches in FIG. 4, weighting circuit $462_{1a}$ is controlled by the first (left-most) element in the shaded row $401_1$ of inverse covariance matrix $270_{avg1}^{-1}$, weighting circuit $462_{1b}$ is controlled by the second (adjacent to the left-most) element in the shaded row $401_1$ of inverse covariance matrix $270_{avg1}^{-1}$, . . . , and weighting circuit $462_{1N}$ is controlled by the $N^{th}$ (right-most) element in the shaded row $401_1$ of inverse covariance matrix $270_{avg1}^{-1}$. Similarly, the N weighting circuits (a through N) of a shift register (not illustrated), corresponding to shift register 460, of transversal filter $44_{27}$, are individually controlled by the corresponding N elements of the first or uppermost row $401_{27}$ of inverse covariance matrix $270_{avg27}^{-1}$ in the illustrated position of the switches $480_x$. For completeness of description, the N weighting circuits (a through N) of a shift register (not illustrated), corresponding to shift register 460, of transversal filter $44_{82}$, are individually controlled by the corresponding N elements of the first or uppermost row $401_{82}$ of inverse covariance matrix $270_{avg82}^{-1}$ in the illustrated position of the switches $480_x$, and the N weighting circuits (a through N) of a shift register (not illustrated), corresponding to shift register 460, of transversal filter $44_R$, are individually controlled by the corresponding N elements of the first or uppermost row $401_R$ of inverse covariance matrix $270_{avgR}^{-1}$ in the illustrated position of the switches $480_x$. When, the movable elements $482_x$ of switches 480 of FIG. 4 move down to their next positions, each of the weighting circuits of the various transverse filters $44_x$ will be controlled by a corresponding one of the elements of the second rows of the inverse covariance matrices.

As the operation of the arrangement of FIG. 4 continues, the movable switch elements $482_x$ of FIG. 4 continue to step downward after each R range clock intervals, so as to operate in synchronism with the pulse rate. At each of the N positions of switch elements $482_x$, a corresponding one of the N elements of a corresponding one of the rows of each inverse covariance matrix is applied to control the weighting value of the N weighting elements of one of the transversal filters $44_x$. Thus, the weighting value of the set of weighting circuits $462_{xx}$ changes at the end of each time-line, so that the weighted value being summed changes after every R range bin clock cycles.

Sampling circuit 466 of the transversal filter of individual matrix processor $44_1$ of FIG. 4, and all the corresponding sampling circuits (not illustrated) of the other sampling circuits $44_x$, are triggered or operated at the end of one time line, or the beginning of the next following time line, corresponding to times 0 of FIG. 2a. Thus, the sum signal from summing circuit 464 is sampled at each time 0. Consequently, a continuous stream of samples of the sum signal from summing circuit 464 is generated at the output of sampling circuit $446_1$, and of all the other sampling circuits. The sampled signal at the output of sampling circuit $446_1$ changes at the beginning of each time line 210 of FIG. 2a to the new sum signal value, and holds that value until the next following pulse occurring at time 0 of each time line. It must be remembered that the sum signal sampled and held in sampling circuit $446_1$ is derived only from the first range interval of each time-line, and that each of the other sampling circuits (not illustrated) samples and holds the sum signal arising from a different range bin. For each range bin, therefore, a continuous stream of samples, taken at the pulse rate, appears at the output of one of the sampling circuits 466 of FIG. 1. The samples from one range bin may then be subject to spectral analysis to determine the amount of low-speed motion of the targets. Such an analysis is advantageous for the purpose of determining the existence of wind shear and other weather phenomena.

Spectral analysis block 50 of FIG. 1 receives the sequence of pulses in each range bin, and performs spectral analysis at and near the pulse rate, to determine the spectral moments. The spectral moment information can then be displayed by display arrangement 52. Thus, in the context of an agile antenna which dwells for a short time at each incremental position, pulse-to-pulse spectral information can be derived from the echo signal, with minimized dwell at each position due to dispensing with the need for fill pulses. The fill pulses are not needed because the echo signals for each range bin are processed by matrix multiplication by the inverse covariance matrix for the range bin in question. The inverse covariance matrix, in turn, is generated prior to actual operation, by operating the radar system in the absence of targets.

Thus, the invention relates to an agile-beam radar system, in which a beam successively occupies a plurality of discrete angular positions. The radar system includes a transmitter arrangement (12: 14, 16, 18) for transmitting recurrent electromagnetic signals in a direction of one of the beams for a predetermined time duration, whereby electromagnetic signals are reflected by targets (22) and clutter (24) lying along the beam. A receiving arrangement (30; 16, 18, 32, 36) is coupled for receiving the reflections of the electromagnetic signals, and for generating recurrent sets of received signals ($210_1$, $210_2$, $210_3$). The received signals ($210_1$, $210_2$, $210_3$) represent the complex envelope of the reflections of the electromagnetic signals. A sampling arrangement (36) is coupled to the receiving arrangement (32), for sampling each of the sets of received signals ($210_1$, $210_2$, $210_3$) at times corresponding to discrete range values ($r_{27}$, $r_{82}$), for thereby generating recurrent pulse-to-pulse sets of range values ($220_x$). The pulse-to-pulse sets of range values, when evaluated at each of single discrete range values, together define a set of pulse-to-pulse finite sequences (220), each at constant range. The radar arrangement includes a covariance matrix generator (46) for generating a covariance matrix (270) for each range bin (r) of each of a plurality (N) of pulse-to-pulse intervals. The covariance matrix represents the covariance of the noise-plus-clutter component of the returned echo signal. An inverse matrix generator (46) is coupled to the covariance matrix generator (46), for generating an inverse matrix representative of the inverse of each of the covariance matrices. The radar system also includes a linear matrix processor (44) coupled to the a sampling arrangement (36) and to the inverse matrix generator (46), for performing matrix multiplication of each of the pulse-to-pulse sequences by that one of the inverse matrices associated with the corresponding range interval, for thereby generating transformed sequences, each of which transformed sequences has different spectral characteristics than that one of the finite sequences from which it arose, in a manner which tends to reduce clutter in the transformed sequence relative to the desired signal characteristics. The resulting information can be processed, as by spectral analysis, and displayed. In a particular embodiment of the invention, the covariance matrix generator is coupled for receiving clutter-plus-noise signals representative of earlier receptions, and for forming a covariance matrix therefrom for groups of one or more range intervals.

Other embodiments of the invention will be apparent to those skilled in the art. For example, the radar system may include range sidelobe suppression, as well as other conventional types of processing. While mechanical switch elements are described for ease of understanding, solid-state equivalents are universally used for such distribution functions. While letters of the alphabet are used, in part, to identify various elements of the processor and various times, their use does not imply that the number of time intervals is in any way limited by the number of letters available in the alphabet.

What is claimed is:

1. An agile-beam radar system in which a beam successively occupies a plurality of different angular positions, said radar system comprising:

transmitting means for transmitting recurrent electromagnetic signals in a direction of one of said beams for a predetermined time duration, whereby electromagnetic signals are reflected by targets and clutter lying along said beam;

receiving means coupled for receiving said reflections of said electromagnetic signals, and for generating recurrent sets of received signals, which received signals represent the complex envelope of said reflections of said electromagnetic signals;

a sampler coupled to said receiving means, for sampling each of said sets of received signals at times corresponding to discrete range values, for thereby generating recurrent pulse-to-pulse sets of range values, with said discrete range values of each of said plural sets together defining a pulse-to-pulse finite sequence at constant range;

covariance matrix generating means coupled for receiving clutter-plus-noise signals representative of earlier receptions, and for forming a covariance matrix therefrom for groups of one or more range intervals, whereby a plurality of covariance matrices are generated for each pulse-to-pulse interval;

inverse matrix generating means coupled to said sampler and to said covariance matrix generating means, for generating an inverse matrix representative of the inverse of each of said covariance matrices;

linear processing means coupled to said sampler and to said inverse matrix generating means, for performing matrix multiplication of each of said pulse-to-pulse sequences by that one of said inverse matrices associated with the corresponding range interval, for thereby generating transformed sequences, each of which transformed sequences has different spectral characteristics than that one of said finite sequences from which it arose, in a manner which tends to reduce clutter in said transformed sequence relative to the desired signal characteristics; and display means coupled to said linear processing means for providing a display of said information contained in said transformed sequences.

2. A system according to claim 1, wherein said covariance matrix generating means is coupled for receiving clutter-plus-noise signals representative of earlier receptions, and for forming a covariance matrix therefrom for groups of one or more range intervals, whereby a plurality of covariance matrices are generated for each pulse-to-pulse interval.

3. A method for operating an agile-beam radar system, comprising the steps of:

successively directing an antenna beam in a plurality of different angular positions;

transmitting recurrent electromagnetic signals in a direction of one of said beams for a predetermined time duration, whereby electromagnetic signals are reflected by targets and clutter lying along said beam;

receiving said reflections of said electromagnetic signals, and generating recurrent sets of received signals, which received signals represent the complex envelope of said reflections of said electromagnetic signals;

sampling each of said sets of received signals at times corresponding to discrete range values, for thereby generating recurrent pulse-to-pulse sets of range values, with said discrete range values of each of said plural sets together defining a pulse-to-pulse finite sequence at constant range;

forming, from clutter-plus-noise signals representative of earlier receptions, a covariance matrix for groups of one or more range intervals, whereby a plurality of covariance matrices are generated for each pulse-to-pulse interval;

generating an inverse matrix representative of the inverse of each of said covariance matrices;

matrix multiplying each of said pulse-to-pulse sequences by that one of said inverse matrices associated with the corresponding range interval, for thereby generating transformed sequences, each of which transformed sequences has different spectral characteristics, than that one of said finite sequences from which it arose, in a manner which tends to reduce clutter in said transformed sequence relative to the desired signal characteristics; and displaying said information contained in said transformed sequences.

4. A method according to claim 3, further comprising, before said step of displaying said information, the step of performing Doppler processing of said sequences for extracting information concerning moving targets.

* * * * *